US008565068B2

(12) United States Patent
Lefrançois et al.

(10) Patent No.: US 8,565,068 B2
(45) Date of Patent: Oct. 22, 2013

(54) SYSTEM AND METHOD FOR PREVENTING DEADLOCK IN DIRECT TUNNEL RELEASE

(75) Inventors: Claude Lefrançois, Laval (CA); Suliman Al-Basheir, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 271 days.

(21) Appl. No.: 13/071,291

(22) Filed: Mar. 24, 2011

(65) Prior Publication Data
US 2012/0243400 A1     Sep. 27, 2012

(51) Int. Cl.
*H04J 1/16*     (2006.01)
*H04L 12/28*    (2006.01)

(52) U.S. Cl.
USPC ............................. 370/216; 370/241; 370/401

(58) Field of Classification Search
None
See application file for complete search history.

(56) References Cited

U.S. PATENT DOCUMENTS

| | | | |
|---|---|---|---|
| 6,937,570 | B2 | 8/2005 | Bhatt et al. |
| 7,729,719 | B2 | 6/2010 | Bergstrom et al. |
| 2006/0009244 | A1* | 1/2006 | Schacht et al. ............... 455/500 |
| 2006/0034213 | A1* | 2/2006 | Munje et al. .................. 370/328 |
| 2008/0004022 | A1* | 1/2008 | Johannesson et al. ........ 455/436 |
| 2008/0102867 | A1* | 5/2008 | Olsson et al. ................. 455/466 |
| 2008/0267143 | A1* | 10/2008 | Pasanen et al. ............... 370/338 |
| 2009/0086667 | A1* | 4/2009 | Sitomaniemi et al. ........ 370/328 |
| 2011/0116499 | A1* | 5/2011 | Lim et al. ...................... 370/355 |
| 2012/0057584 | A1* | 3/2012 | Johansson et al. ............ 370/338 |
| 2012/0063392 | A1* | 3/2012 | Sitomaniemi et al. ........ 370/328 |
| 2012/0170453 | A1* | 7/2012 | Tiwari ........................... 370/230 |

FOREIGN PATENT DOCUMENTS

| | | |
|---|---|---|
| EP | 2037633 A1 | 3/2009 |
| WO | 2008080717 A1 | 7/2008 |

OTHER PUBLICATIONS

3rd Generation Partnership project;Technical Specification Group Services and System Aspects;One Tunnel Functional description;(Release 7) 3GPP TR 23.809 V1.0.0, Sep. 2006, pp. 01-50.
3rd Generation Partnership project;Technical Specification Group Core Network and Terminals;General Packet Radio Service(GPRS);GPRS Tunnelling Protocol (GTP) across the Gn and Gp interface (Release 10),3GPP TS 29.060 V10.0.0, Dec. 2010, pp. 01-162.
3rd Generation Partnership project;Technical Specification Group Services and System Aspects;Direct tunnel deployment guideline(Release 9),3GPP TR 23.919 V9.0.0, Dec. 2009, pp. 01-11.
3rd Generation Partnership project;Technical Specification Group Services and System Aspects;General Packet Radio Service(GPRS);Service description;Stage 2(Release 7),3GPP TS 23.060 V7.10.0, Sep. 2010,pp. 01-217.
PCT Search Report from corresponding application PCT/IB2012/051383.

* cited by examiner

*Primary Examiner* — Andrew Lee
(74) *Attorney, Agent, or Firm* — David J Rahmer; Ericsson Canada Inc.

(57) ABSTRACT

A system and method for preventing the occurrence of a signaling deadlock between a SGSN and a GGSN during an overlap of the functionality of the direct tunnel normal release and the direct tunnel error indication procedures is provided. An indication that the error is caused by a normal release of tunnel resources instructs the GGSN to invoke an error handling procedure to mitigate deadlock by delaying the operation of its error indication procedure.

18 Claims, 4 Drawing Sheets

SYSTEM AND METHOD FOR PREVENTING DEADLOCK IN DIRECT TUNNEL RELEASE

TECHNICAL FIELD

The present invention relates generally to procedures and mechanisms for mitigating the occurrence of a signaling deadlock in mobile networks.

BACKGROUND

The General Packet Radio Service (GPRS) network architecture can be viewed as an evolution of the Global System for Mobile Communications (GSM) network carrying both circuit switched and packet data. With GPRS providing a move from circuit switched technology to packet switched technology, it was necessary to upgrade the network architecture to accommodate this. The main new network architecture entities that are added are the Gateway GPRS Support Node (GGSN) and the Serving GPRS Support Node (SGSN). In brief, the SGSN forms a gateway to the services within the network, while the GGSN acts as an interface and a router to external networks. The GGSN contains routing information for GPRS mobile devices, which is used to tunnel packets through the IP based internal backbone to the correct SGSN.

When a mobile device attaches to a SGSN and wants to begin transferring data, it must first activate a Packet Data Protocol (PDP) address. Activating a PDP address establishes an association between the mobile device's current SGSN and the GGSN that anchors the PDP address. The data record kept by the SGSN and the GGSN regarding this association is called the PDP context. A given PDP context is in the active state when this PDP address is activated for data transfer. PDP context procedures have been defined in order to create, modify, and delete PDP contexts within the SGSN and GGSN entities.

Direct tunnel is an enhanced functionality in 3G networks that enables operators to simplify their mobile packet data networks. Direct tunnel allows data traffic to be routed directly from the Radio Access Network (RAN) to the core network's Internet Gateway node (the GGSN), bypassing the control node (the SGSN) through which data traffic was routed in previous network architectures. Even though the payload bypasses the SGSN, all signaling traffic will still be communicated between the SGSN and GGSN. If any abnormal situation happens during the direct tunnel, the GGSN and SGSN shall communicate signaling to switch back to the normal tunnel for payload between the SGSN and the GGSN. As such, the PDP context needs to be maintained between the SGSN and GGSN.

Reference is now made to FIG. 1 (Prior Art). The 3G direct tunnel normal release procedure involves signaling between the Radio Network Controller (RNC) 100, the SGSN 102 and the GGSN 104. When the RNC 100 initiates a direct tunnel normal release, it sends a Radio Access Bearer (RAB) Release Request message 110 and an Interface (Iu) Release Request message 112 to the SGSN 102 to indicate that tunnel resources should be released. In response, the SGSN 102 sends an Update PDP Context Request message 120 to the GGSN 104. The GGSN 104 replies with an Update PDP Context Response 122.

Reference is now made to FIG. 2 (Prior Art). The 3G direct tunnel error indication procedure involves signaling between the Radio Network Controller (RNC) 100, the Serving GPRS Support Node (SGSN) 102 and the GPRS Gateway Support Node (GGSN) 104. If tunnel resources have already been released, the RAB does not exist, and the RNC 100 receives a payload 130 from the GGSN 104, it will respond with an error indication message 132. In response to the error message 132, the GGSN 104 sends an Update PDP Context Request message 140 to the SGSN 102. The SGSN 102 replies with an Update Context Response 142.

Referring now to FIG. 3 (Prior Art), under some circumstances the functionality of the 3G direct tunnel normal release procedure (shown in FIG. 1) and the 3G direct tunnel error indication procedure (shown in FIG. 2) overlap. If the RNC 100 initiates the release of tunnel resources at the same, or similar, time as the GGSN 104 forwards a payload 130 to the RNC 100, it is possible that both the resulting Update PDP Context Request messages 120 and 140 are sent within the same period, and signaling deadlock can occur between the SGSN 102 and the GGSN 104.

For instance, if the PDP context state is in the update state in the GGSN 104, the GGSN 104 will not consider any PDP updates, such as PDP Context Request 120, because the GGSN 104 is waiting for an Update PDP Context Response, such as response 142 in FIG. 2. In this case, the Update PDP Context Request 120 from the SGSN 102 is rejected by the GGSN 104. Likewise, the PDP context state is set to the update state in the SGSN 102, and the Update PDP Context Request 140 from the GGSN 104 will be rejected by the SGSN 102 as it waits for a PDP update response. In this scenario, the SGSN 102 and GGSN 104 are now in signaling deadlock, and the PDP context for the user may be terminated. The user equipment may have to perform a new GPRS attach procedure and a new PDP context activation procedure. Undesirable delays and added signaling will impact both the user's experience and the operator's network resources.

At present, there is no mechanism supported by an open standard group in the GPRS core network space, such as the 3GPP Forum, that provides for an error handling procedure to prevent deadlock from occurring. When the deadlock scenario occurs, the SGSN and GGSN are not able to resolve the overlap in direct tunnel release and error handling procedures without impacting the user's experience.

Accordingly, it should be readily appreciated that in order to overcome the deficiencies and shortcomings of the existing solutions, it would be advantageous to have a solution for preventing deadlock without impacting the user.

SUMMARY

It is an object of the present invention to obviate or mitigate at least one disadvantage of the prior art.

In a first aspect of the present invention there is provided a method for preventing deadlock in a direct tunnel normal release procedure, comprising, receiving a message indicating an error; determining, in accordance with the received message, that the error is associated with a release of tunnel resources; and invoking an error handling procedure to mitigate deadlock between a SGSN and a GGSN. The error handling procedure may include waiting to receive an update PDP context request from a SGSN. The error handling procedure may include sending an update PDP context request to the SGSN following a predetermined timeout period. The error handling procedure may be terminated prior to sending the update PDP context request, if a prior update PDP context request has already been received from the SGSN. The received message may include an indicator that a normal release of tunnel resources has occurred. The received message may include a tunnel endpoint identifier, a GSN address, and a private extension information element indicating that a normal release of tunnel resources has occurred.

In a second aspect of the present invention there is provided a method for preventing deadlock in a direct tunnel normal release procedure, for execution by a RNC, comprising, sending a message initiating a release of tunnel resources; receiving a payload; and sending an error message to an upstream node, in response to the received payload. The error message includes an indication that the cause of the error is the release of tunnel resources. The upstream node may be a GGSN. The error message includes an instruction that the upstream node should invoke an error handling procedure to mitigate deadlock between a SGSN and a GGSN.

In a third aspect of the present invention there is provided a support node comprising a processor; a communication interface, operationally connected to the processor; and an instruction repository. The communication interface receives a message indicating an error. The instruction repository stores instructions that when executed by the processor cause the processor to determine, in accordance with the received message, that the error is associated with a release of tunnel resources; and to invoke an error handling procedure to mitigate deadlock between a SGSN and a GGSN. The error handling procedure may include waiting for a predetermined timeout period to receive an update PDP context request. The error handling procedure may further include instructing the communication interface to send an update PDP context request following an expiration of the predetermined timeout period. The error handling procedure may be terminated following an expiration of the predetermined timeout period, if the update PDP context request has already been received by the communication interface.

In a fourth aspect of the present invention there is provided a RNC comprising a processor; a communication interface, operationally connected to the processor; and, an instruction repository storing instructions that when executed by the processor cause the processor to instruct the communication interface to send a message initiating a release of tunnel resources. The communication interface receives a payload. In response to the received payload, the processor instructs the communication interface to send an error message to an upstream node, including an indication that the cause of the error is the release of tunnel resources.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

The present invention is generally directed to a system and method for preventing deadlock during direct tunnel normal release procedures. Below are presented several different exemplary options for mitigating the occurrence of deadlock between network nodes.

Figure 1:
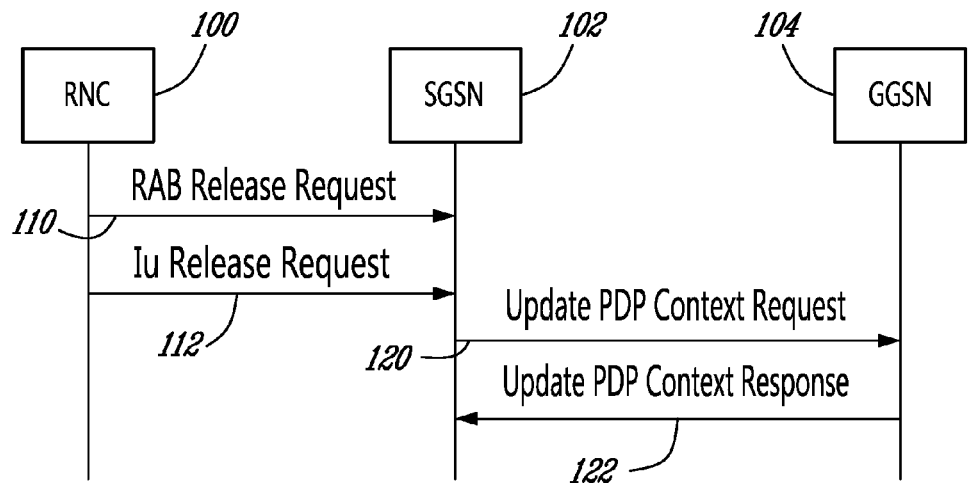
FIG. 1 illustrates a prior art tunnel release procedure.
Figure 2:
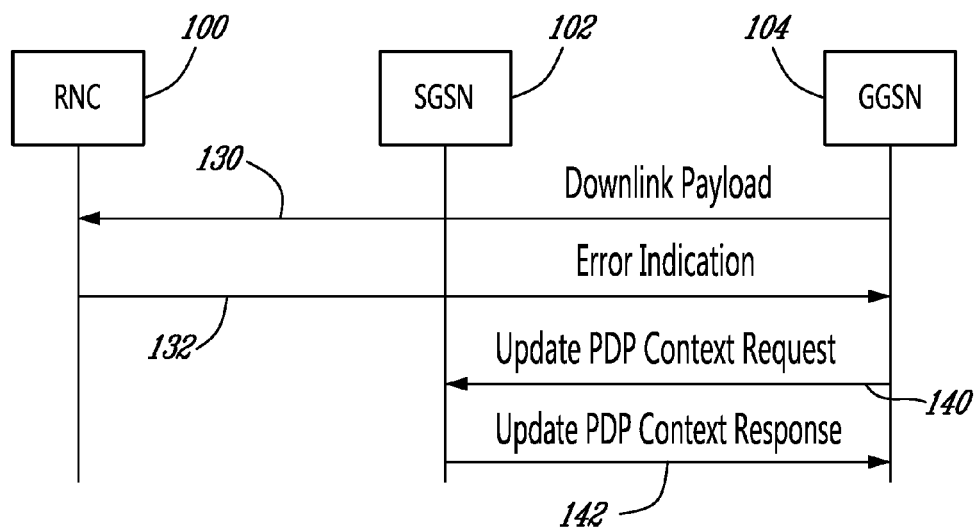
FIG. 2 illustrates a prior art error handling procedure.
Figure 3:
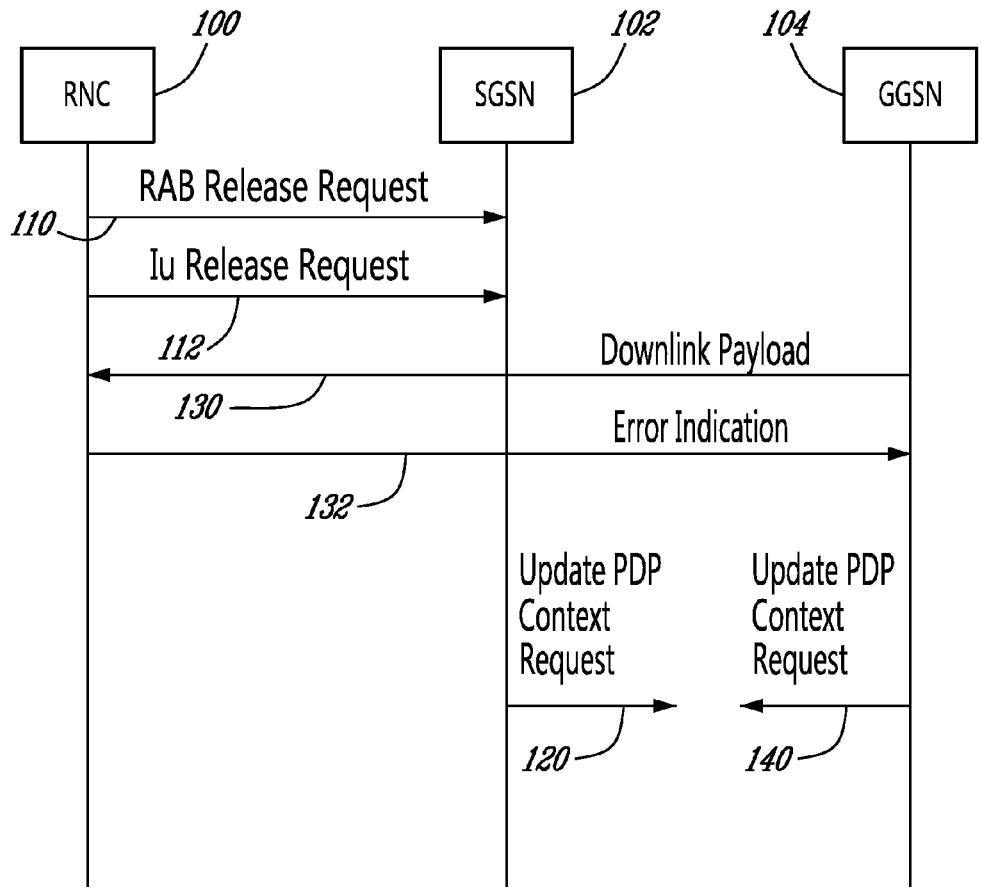
FIG. 3 illustrates a prior art deadlock scenario.
Figure 4:
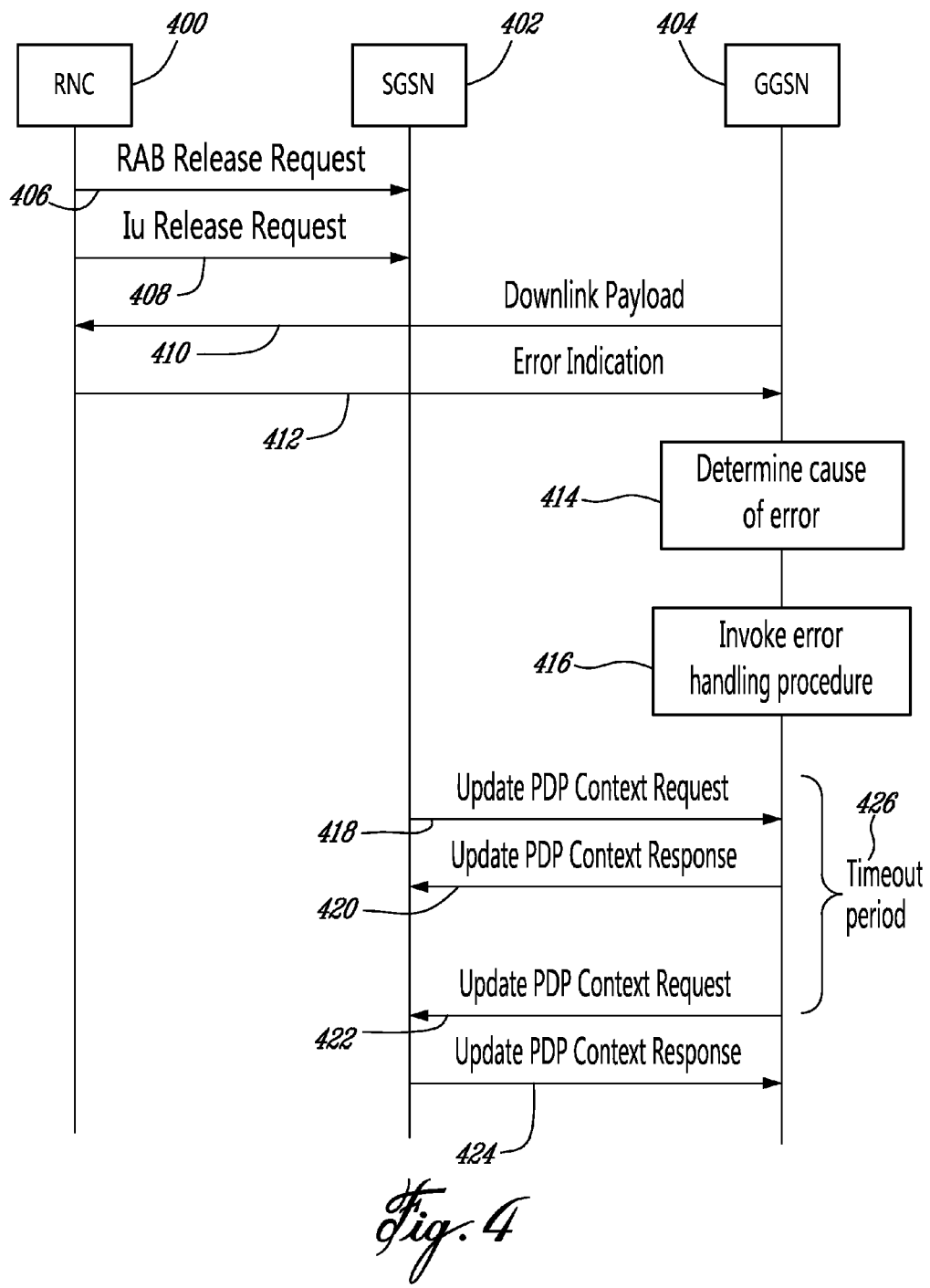
FIG. 4 illustrates a signal flow of an embodiment of the present invention.

FIG. 4 illustrates a signal flow for an exemplary process of the present invention. RNC 400 initiates a direct tunnel normal release procedure by sending RAB Release Request 406 and Iu Release Request 408 to the SGSN 402 to indicate that tunnel resources are to be released. The GGSN 404 subsequently forwards payload 410 to the RNC 400. As the tunnel release has already been initiated, RNC 400 is not able to send the payload data to the intended recipient. The RNC 400 replies to the GGSN 404 with an error indication message 412. The error message 412 includes an indicator that this error is caused by a normal release of the tunnel resources.

The error indication message 412 preferably contains a tunnel endpoint identifier, a GSN address and may optionally contain a private extension. The private extension may be a GTP Private Extension Information Element (IE) as described in the 3GPP TS 29.060 v8.12.0 at section 7.3.7. The private extension IE may be used to return information to the GGSN 404 indicating that the payload cannot be forwarded to the recipient UE because the RNC 400 has already released the direct tunnel under normal tunnel release procedures.

The error indication message 412 is received by the GGSN 404. In accordance with the information contained in the error message 412, the GGSN 404 determines that the error has been caused by normal tunnel release initiated by the RNC 400, in step 414. The GGSN 404 then invokes an error handling procedure 416 to mitigate deadlock between the SGSN 402 and the GGSN 404.

The error handling procedure 416 may involve delaying the conventional tunnel error handling procedure by the GGSN 404 by a predetermined amount of time, for example timeout period 426. This allows the SGSN 402 to perform the rest of the normal direct tunnel release procedure. The SGSN 402 will contact the GGSN 404 with Update PDP Context Request message 418 in response to the RAB Release Request 408. Following completion of the PDP context update procedure, and delivery of the Update PDP Context Response 420 to the SGSN 402, the timeout period 426 expires. If the GGSN 404 has received the Update PDP Context Request 418 and the PDP Context update procedure has been successfully completed, the GGSN 404 should not proceed with its conventional tunnel error handling procedure, as it is no longer necessary, as the PDP Context has already been updated. As such, the error handling procedure may be terminated upon expiration of the timeout period 426.

However, if the timeout period 426 expires and the GGSN 404 has not received an Update PDP Context Request from the SGSN 402, the GGSN 404 may proceed with the tunnel error handling procedure. Update PDP Context Request message 422 is sent to the SGSN 424 and Update PDP Context Response message 424 is returned.

Alternatively, the GGSN 404 may proceed with its tunnel error handling procedure regardless of if the SGSN 402 initiated PDP context update procedure has been completed or not, following the timeout period 426.

The timeout period 426 may be a predetermined period of time in the range of 5 seconds to 15 seconds. The expiration of the timeout period may be measured from the receipt of the error indication 412, or alternatively, from the time of invocation of the error handling procedure 416 to mitigate deadlock between SGSN 402 and GGSN 404.

In an alternative method of the present invention, the RNC 400 may delay sending the error indication message 412 to the GGSN 404 by a predetermined period of time following the receipt of the payload 410.

One skilled in the art will appreciate that in alternative embodiments, the RNC 400 may send the error indication message 412 to a network node, or nodes, other than the GGSN 404. The node may invoke an error handling procedure to mitigate deadlock between SGSN 402 and GGSN 404.

Figure 5:
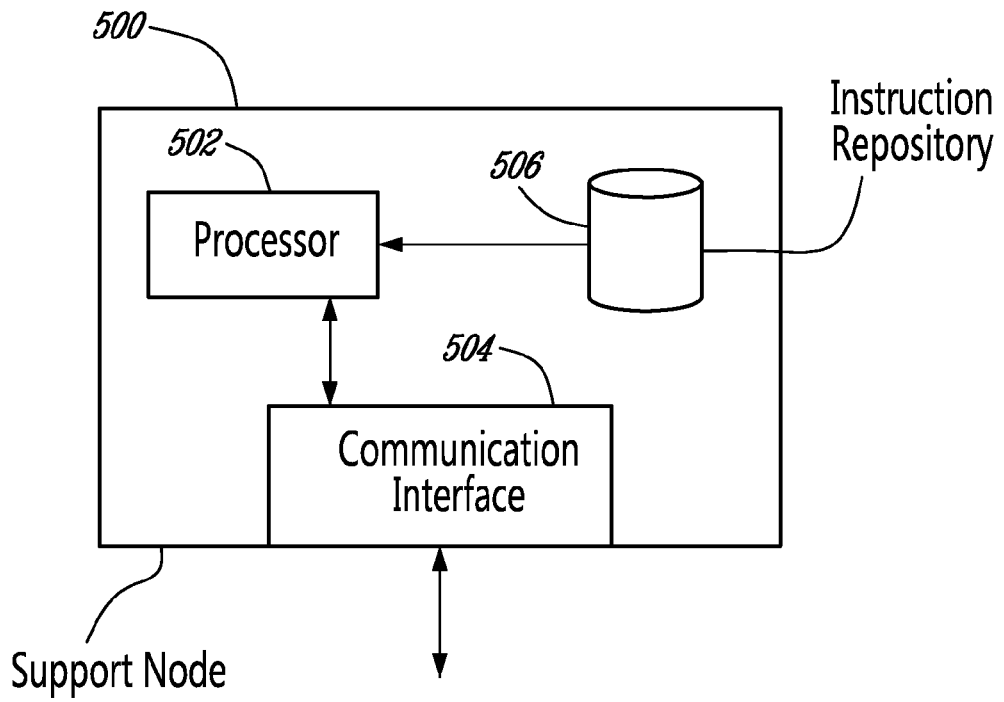
FIG. 5 illustrates a support node of the present invention.

FIG. 5 illustrates an exemplary embodiment of a support node 500 of the present invention. Support node 500 is preferably a GGSN. Support node 500 includes a processor 502, a communication interface 504 and an instruction repository 506. The communication interface 504 receives a message indicating an error. The processor 502 determines, in accordance with the received message, that the error is associated with a release of tunnel resources. The instruction repository 506 stores instructions, that when executed by the processor 502, cause the processor 502 to invoke an error handling procedure to mitigate signaling deadlock between the support node 500 and a second associated support node (not shown), in response to the error being associated with a release of tunnel resources. The error handling procedure may include waiting a predetermined amount of time before instructing the communication interface 504 to send a PDP context update request to the second associated support node.

Figure 6:
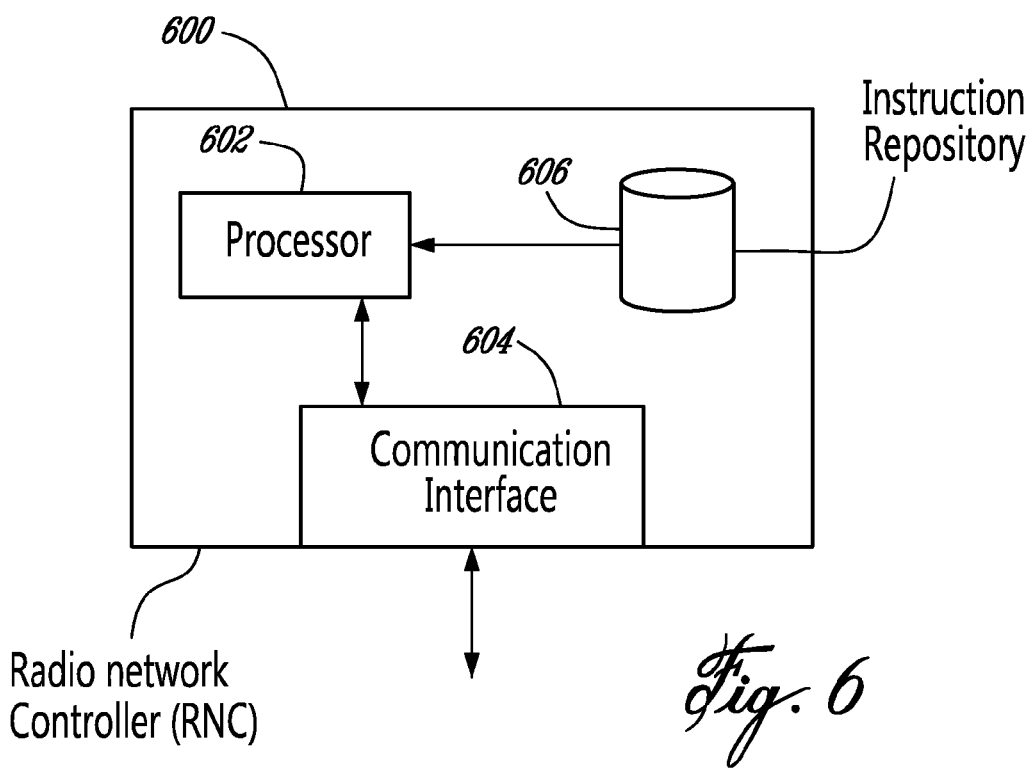
FIG. 6 illustrates a radio network controller of the present invention.

FIG. 6 illustrates an exemplary embodiment of a radio network controller (RNC) 600 of the present invention. RNC 600 includes a processor 602, a communication interface 604 and an instruction repository 606. The instruction repository 606 stores instructions that, when executed by the processor 602, cause the processor 602 to instruct the communication interface 604 to send a message initiating a release of tunnel resources. Following the initiation of releasing tunnel resources, the communication interface 604 receives a payload. In response to the received payload, the processor 602 instructs the communication interface 604 to send an error message to an upstream node, preferably a SGSN or a GGSN. The error message includes an indication that the cause of the error is the release of tunnel resources by RNC 600. The error message may alternatively also include an instruction that the upstream node receiving the message should invoke an error handling procedure to mitigate signaling deadlock between the SGSN and the GGSN.

Based upon the foregoing, it should now be apparent to those of ordinary skill in the art that the present invention provides an advantageous solution. Although the system and method of the present invention have been described with particular reference to certain type of messages and nodes, it should be realized upon reference hereto that the innovative teachings contained herein are not necessarily limited thereto and may be implemented advantageously in various manners. It is believed that the operation and construction of the present invention will be apparent from the foregoing description.

Embodiments of the invention may be represented as a software product stored in a non-transitory machine-readable medium (also referred to as a computer-readable medium, a processor-readable medium, or a computer-usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those skilled in the art without departing from the scope of the invention, which is defined solely by the claims appended hereto.

What is claimed is:

1. A method for preventing deadlock in a direct tunnel normal release procedure, comprising:
    receiving, at a communication interface, an error message including an indication that the cause of the error is the release of tunnel resources;
    determining, in accordance with the received error message, that the error is associated with the normal release of tunnel resources; and
    invoking an error handling procedure to mitigate deadlock between a Serving GPRS Support Nodes (SGSN) and a GPRS Gateway Support Node (GGSN).

2. The method of claim 1, wherein the error handling procedure includes waiting to receive an update Packet Data Protocol (PDP) context request.

3. The method of claim 2, wherein the update PDP context request is received from the SGSN.

4. The method of claim 1, wherein the error handling procedure includes sending an update PDP context request following a predetermined timeout period.

5. The method of claim 4, wherein the error handling procedure is terminated prior to sending the update PDP context request, if a prior update PDP context request has been received from the SGSN.

6. The method of claim 4, wherein the update PDP context request is sent to the SGSN.

7. The method of claim 1, wherein the received error message includes a tunnel endpoint identifier, a GSN address, and a private extension information element; the private extension information element indicating that a normal release of tunnel resources has occurred.

8. A method for preventing deadlock in a direct tunnel normal release procedure, for execution by a Radio Network Controller (RNC), comprising:
    sending a message initiating a release of tunnel resources;
    receiving a payload; and
    sending an error message to an upstream node, in response to the received payload, the error message including an indication that the cause of the error is the release of tunnel resources.

9. The method of claim 8, wherein the upstream node is a GGSN.

10. The method of claim 8, wherein the error message includes an instruction that the upstream node should invoke an error handling procedure to mitigate deadlock between a SGSN and a GGSN.

11. The method of claim 8, wherein the error message includes a tunnel endpoint identifier, a GSN address, and a private extension information element; the private extension information element indicating that a normal release of tunnel resources has occurred.

12. A support node, comprising:
   a processor;
   a communication interface, operationally connected to the processor, the communication interface receives an error message including an indication that the cause of the error is the release of tunnel resources;
   an instruction repository storing instructions that when executed by the processor cause the processor to:
      determine, in accordance with the received message, that the error is associated with the normal release of tunnel resources; and
      invoke an error handling procedure to mitigate deadlock between a SGSN and a GGSN.

13. The support node of claim 12, wherein the error handling procedure includes waiting for a predetermined timeout period to receive, at the communication interface, an update PDP context request.

14. The support node of claim 13, wherein the error handling procedure further includes instructing the communication interface to send an update PDP context request following an expiration of the predetermined timeout period.

15. The support node of claim 13, wherein the error handling procedure is terminated following an expiration of the predetermined timeout period, if the update PDP context request has been received by the communication interface.

16. A radio network controller (RNC), comprising:
   a processor;
   a communication interface, operationally connected to the processor;
   an instruction repository storing instructions that when executed by the processor cause the processor to instruct the communication interface to send a message initiating a release of tunnel resources;
   the communication interface receives a payload;
   in response to the received payload, the processor instructs the communication interface to send an error message to an upstream node, the error message including an indication that the cause of the error is the release of tunnel resources.

17. The radio network controller of claim 16, wherein the upstream node is a GGSN.

18. The radio network controller of claim 16, wherein the error message includes an instruction that the upstream node should invoke an error handling procedure to mitigate deadlock between a SGSN and a GGSN.

* * * * *